(12) United States Patent
Jäger et al.

(10) Patent No.: US 10,040,132 B2
(45) Date of Patent: Aug. 7, 2018

(54) ROTARY TOOL, IN PARTICULAR A DRILL FOR SUCH A ROTARY TOOL

(71) Applicant: Kennametal Inc., Latrobe, PA (US)

(72) Inventors: Horst Jäger, Nürnberg (DE); Jürgen Schwägerl, Vohenstrauss (DE); Berthold Zeug, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/190,284

(22) Filed: Jun. 23, 2016

(65) Prior Publication Data
US 2016/0375499 A1    Dec. 29, 2016

(30) Foreign Application Priority Data
Jun. 24, 2015    (DE) .................. 10 2015 211 744

(51) Int. Cl.
*B23B 51/02*    (2006.01)

(52) U.S. Cl.
CPC .......... *B23B 51/02* (2013.01); *B23B 2251/02* (2013.01); *Y10T 408/9098* (2015.01)

(58) Field of Classification Search
CPC ..... B23B 51/02; B23B 51/00; B23B 2251/02; B23B 2251/50; B23B 2240/04; Y10T 408/9098; Y10T 408/90993; Y10T 408/9097; Y10T 408/907; Y10T 408/892
See application file for complete search history.

(56) References Cited

U.S. PATENT DOCUMENTS

| | | |
|---|---|---|
| 22,394 A | 12/1858 | White et al. |
| 40,297 A | 10/1863 | Wakefield |
| 44,915 A | 11/1864 | Baker |
| 273,388 A | 3/1883 | Peatt |
| 273,391 A | 3/1883 | Thrasher |
| 329,660 A | 11/1885 | Lord |
| 658,216 A | 9/1900 | Munger |

(Continued)

FOREIGN PATENT DOCUMENTS

| | | |
|---|---|---|
| AT | 9431 B | 10/1902 |
| CN | 1160370 A | 9/1997 |

(Continued)

OTHER PUBLICATIONS

May 9, 2017 Second Office Action.

(Continued)

*Primary Examiner* — Daniel Howell
(74) *Attorney, Agent, or Firm* — Matthew S. Bedsole

(57) ABSTRACT

The rotary tool comprises a support and a cutting head which can be inserted into a pin receptacle of the support via a coupling pin. The support and the cutting head have mutually corresponding surface sections for transferring a radial clamping force and have mutually corresponding torque sections for transferring torque. For an axial pull-out stop device, effective stop surfaces are formed on the pin receptacle and on the coupling pin in the axial direction, wherein, to do this, a stop element is formed, the radial extension of which is smaller than or equal to a radial extension ($r_2$) of the surface sections of the coupling pin and wherein the stop surfaces and the surface section are offset relative to each other in the circumferential direction.

9 Claims, 3 Drawing Sheets

(56) References Cited

U.S. PATENT DOCUMENTS

| | | |
|---|---|---|
| 690,093 A | 12/1901 | Beach |
| 756,339 A | 4/1904 | Down |
| 932,071 A | 8/1909 | Urbscheit |
| 1,461,548 A | 7/1923 | West |
| 2,158,120 A | 5/1939 | Hirschberg |
| 2,289,683 A | 7/1942 | Malone |
| 2,294,969 A | 9/1942 | Engvall |
| 3,140,749 A | 7/1964 | Dionisotti |
| 3,153,356 A | 10/1964 | Dearborn |
| 3,293,727 A | 12/1966 | Simms |
| 3,359,837 A | 12/1967 | Andreasson |
| 3,410,749 A | 11/1968 | Chmiel |
| 3,434,553 A | 3/1969 | Weller |
| 3,548,688 A | 12/1970 | Kuch |
| 3,765,496 A | 10/1973 | Flores |
| 4,293,253 A | 10/1981 | Ott |
| D262,219 S | 12/1981 | Lassiter |
| D263,598 S | 3/1982 | Lassiter |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,561,812 A | 12/1985 | Linden |
| 4,744,704 A | 5/1988 | Galvefors |
| 4,844,643 A | 7/1989 | Icks |
| 5,024,563 A | 6/1991 | Randall |
| 5,114,286 A | 5/1992 | Calkins |
| 5,154,549 A | 10/1992 | Isobe |
| 5,154,550 A | 10/1992 | Isobe |
| 5,228,812 A | 7/1993 | Noguchi |
| 5,346,335 A | 9/1994 | Harpaz |
| 5,429,199 A | 7/1995 | Sheirer |
| 5,452,971 A | 9/1995 | Nevills |
| 5,509,761 A | 4/1996 | Grossman |
| 5,634,747 A | 6/1997 | Tukala |
| 5,649,794 A | 7/1997 | Kress |
| 5,685,671 A | 11/1997 | Packer |
| 5,769,577 A | 6/1998 | Boddy |
| 5,791,838 A | 8/1998 | Hamilton |
| 5,863,162 A | 1/1999 | Karlsson |
| 5,904,455 A | 5/1999 | Krenzer |
| 5,957,631 A | 9/1999 | Hecht |
| 5,971,673 A | 10/1999 | Berglund |
| 5,980,166 A | 11/1999 | Ogura |
| 5,988,953 A | 11/1999 | Berglund |
| 5,996,714 A | 12/1999 | Massa |
| 6,000,000 A | 12/1999 | Hawkins |
| 6,012,881 A | 1/2000 | Scheer |
| 6,045,301 A | 4/2000 | Kammermeier |
| 6,059,492 A | 5/2000 | Hecht |
| 6,071,045 A | 6/2000 | Janness |
| 6,109,841 A | 8/2000 | Johne |
| 6,123,488 A | 9/2000 | Kasperik |
| 6,276,879 B1 | 8/2001 | Hecht |
| 6,447,218 B1 | 9/2002 | Lagerberg |
| 6,481,938 B2 | 11/2002 | Widin |
| 6,485,235 B1 | 11/2002 | Mast |
| 6,506,003 B1 | 1/2003 | Erickson |
| 6,514,019 B1 | 2/2003 | Schulz |
| 6,524,034 B2 | 2/2003 | Engstrand |
| 6,530,728 B2 | 3/2003 | Eriksson |
| 6,582,164 B1 | 6/2003 | McCormick |
| 6,595,305 B1 | 7/2003 | Dunn |
| 6,595,727 B2 | 7/2003 | Arvidsson |
| 6,626,614 B2 | 9/2003 | Nakamura |
| 6,648,561 B2 | 11/2003 | Kraemer |
| 6,840,717 B2 | 1/2005 | Eriksson |
| 7,008,150 B2 | 3/2006 | Krenzer |
| 7,048,480 B2 | 5/2006 | Borschert |
| 7,070,367 B2 | 7/2006 | Krenzer |
| 7,114,892 B2 | 10/2006 | Hansson |
| 7,125,207 B2 | 10/2006 | Craig |
| 7,134,816 B2 | 11/2006 | Brink |
| 7,189,437 B2 | 3/2007 | Kidd |
| 7,198,437 B2 | 4/2007 | Jonsson |
| 7,237,985 B2 | 7/2007 | Leuze |
| 7,306,410 B2 | 12/2007 | Borschert |
| 7,309,196 B2 | 12/2007 | Ruy Frota de Souza |
| 7,311,480 B2 | 12/2007 | Heule |
| 7,360,974 B2 | 4/2008 | Borschert |
| 7,377,730 B2 | 5/2008 | Hecht |
| 7,407,350 B2 | 8/2008 | Hecht |
| 7,431,543 B2 | 10/2008 | Buettiker |
| 7,467,915 B2 | 12/2008 | de Souza |
| 7,559,382 B2 | 7/2009 | Koch |
| 7,591,617 B2 | 9/2009 | Borschert |
| D607,024 S | 12/2009 | Dost |
| 7,625,161 B1 | 12/2009 | Ruy Frota de Souza |
| 7,677,842 B2 | 3/2010 | Park |
| 7,740,472 B2 | 6/2010 | Delamarche |
| 7,775,751 B2 | 8/2010 | Hecht |
| 7,832,967 B2 | 11/2010 | Borschert |
| D632,320 S | 2/2011 | Chen |
| D633,534 S | 3/2011 | Chen |
| 7,972,094 B2 | 7/2011 | Men |
| RE42,644 E | 8/2011 | Jonsson |
| 7,997,832 B2 | 8/2011 | Prichard |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson |
| 8,366,358 B2 | 2/2013 | Borschert |
| 8,376,669 B2 | 2/2013 | Jaeger |
| 8,430,609 B2 | 4/2013 | Frejd |
| 8,449,227 B2 | 5/2013 | Danielsson |
| 8,534,966 B2 | 9/2013 | Hecht |
| 8,556,552 B2 | 10/2013 | Hecht |
| 8,596,935 B2 | 12/2013 | Fang |
| 8,678,722 B2 | 3/2014 | Aare |
| 8,678,723 B2 * | 3/2014 | Osawa ............... B23B 51/02 |
| | | 279/93 |
| 8,721,235 B2 | 5/2014 | Kretzschmann |
| D708,034 S | 7/2014 | Huang |
| 8,784,018 B2 | 7/2014 | Pabel |
| 8,784,019 B2 | 7/2014 | Pabel |
| D711,719 S | 8/2014 | DeBaker |
| 8,807,888 B2 | 8/2014 | Borschert |
| 8,882,413 B2 | 11/2014 | Hecht |
| 8,931,982 B2 | 1/2015 | Osawa |
| 8,992,142 B2 | 3/2015 | Hecht |
| 9,028,180 B2 | 5/2015 | Hecht |
| 9,050,659 B2 | 6/2015 | Schwaegerl |
| 9,073,128 B2 | 7/2015 | Mack |
| 9,079,255 B2 | 7/2015 | Jager |
| 9,162,295 B2 | 10/2015 | Pabel |
| D742,714 S | 11/2015 | King, Jr. |
| D742,948 S | 11/2015 | Kenno |
| 9,180,650 B2 | 11/2015 | Fang |
| 9,205,498 B2 | 12/2015 | Jaeger |
| 9,248,512 B2 | 2/2016 | Aare |
| 9,296,049 B2 | 3/2016 | Schwaegerl |
| 9,302,332 B2 | 4/2016 | Scanlon |
| 9,371,701 B2 | 6/2016 | Cox |
| 9,481,040 B2 | 11/2016 | Schwaegerl |
| 9,498,829 B2 | 11/2016 | Zabrosky |
| D798,921 S | 10/2017 | Frota De Souza Filho |
| D798,922 S | 10/2017 | Frota De Souza Filho |
| 2001/0033780 A1 | 10/2001 | Berglund et al. |
| 2002/0159851 A1 | 10/2002 | Krenzer |
| 2002/0168239 A1 | 11/2002 | Mast |
| 2002/0195279 A1 | 12/2002 | Bise |
| 2003/0039523 A1 | 2/2003 | Kemmer |
| 2003/0091402 A1 | 5/2003 | Lindblom |
| 2004/0240949 A1 | 12/2004 | Pachao-Morbitzer |
| 2005/0084352 A1 | 4/2005 | Borschert |
| 2005/0135888 A1 | 6/2005 | Stokey |
| 2006/0072976 A1 | 4/2006 | Frota de Souza |
| 2006/0093449 A1 | 5/2006 | Hecht |
| 2008/0003072 A1 | 1/2008 | Kim |
| 2008/0175676 A1 | 7/2008 | Prichard |

(56) References Cited

U.S. PATENT DOCUMENTS

| | | |
|---|---|---|
| 2008/0175677 A1 | 7/2008 | Prichard |
| 2008/0181741 A1 | 7/2008 | Borschert |
| 2008/0193231 A1 | 8/2008 | Jonsson |
| 2008/0193237 A1 | 8/2008 | Men |
| 2009/0044986 A1 | 2/2009 | Jaeger |
| 2009/0067942 A1 | 3/2009 | Tanaka |
| 2009/0071723 A1 | 3/2009 | Mergenthaler |
| 2009/0116920 A1 | 5/2009 | Bae |
| 2009/0123244 A1 | 5/2009 | Buettiker |
| 2009/0311060 A1 | 12/2009 | Frejd |
| 2010/0021253 A1 | 1/2010 | Frejd |
| 2010/0092259 A1 | 4/2010 | Borschert |
| 2010/0143059 A1 | 6/2010 | Hecht |
| 2010/0247255 A1 | 9/2010 | Nitzsche |
| 2010/0266357 A1 | 10/2010 | Kretzschmann |
| 2010/0272529 A1 | 10/2010 | Rozzi |
| 2010/0307837 A1 | 12/2010 | King |
| 2010/0322723 A1 | 12/2010 | Danielsson |
| 2010/0322728 A1 | 12/2010 | Aare |
| 2010/0322729 A1 | 12/2010 | Päbel |
| 2010/0322731 A1 | 12/2010 | Aare |
| 2011/0020072 A1 | 1/2011 | Chen |
| 2011/0020073 A1 | 1/2011 | Chen |
| 2011/0020077 A1 | 1/2011 | Fouquer |
| 2011/0027021 A1 | 2/2011 | Nelson |
| 2011/0081212 A1 | 4/2011 | Spichtinger |
| 2011/0097168 A1 | 4/2011 | Jager |
| 2011/0110735 A1 | 5/2011 | Klettenheimer |
| 2011/0110739 A1 | 5/2011 | Frisendahl |
| 2011/0168453 A1 | 7/2011 | Kersten |
| 2011/0229277 A1 | 9/2011 | Hoffer |
| 2011/0236145 A1 | 9/2011 | Päbel |
| 2011/0299944 A1 | 12/2011 | Hofermann |
| 2011/0318128 A1 | 12/2011 | Schwagerl |
| 2012/0003056 A1 | 1/2012 | Jaeger |
| 2012/0014760 A1 | 1/2012 | Glimpel |
| 2012/0082518 A1 | 4/2012 | Woodruff |
| 2012/0087746 A1 | 4/2012 | Fang |
| 2012/0087747 A1 | 4/2012 | Fang |
| 2012/0099937 A1 | 4/2012 | Osawa |
| 2012/0121347 A1 | 5/2012 | Osawa |
| 2012/0308319 A1 | 12/2012 | Sampath |
| 2012/0315101 A1 | 12/2012 | Osawa |
| 2013/0183107 A1 | 7/2013 | Fang |
| 2013/0183112 A1 | 7/2013 | Schwagerl |
| 2013/0209189 A1 | 8/2013 | Borschert |
| 2013/0223943 A1 | 8/2013 | Gey et al. |
| 2013/0259590 A1 | 10/2013 | Shaheen |
| 2013/0266389 A1 | 10/2013 | Hecht |
| 2014/0023449 A1 | 1/2014 | Jonsson |
| 2014/0255115 A1 | 9/2014 | Zabrosky |
| 2014/0255116 A1 | 9/2014 | Myers |
| 2014/0301799 A1 | 10/2014 | Schwaegerl |
| 2014/0321931 A1 | 10/2014 | Gey |
| 2014/0348602 A1 | 11/2014 | Schwaegerl |
| 2015/0063926 A1 | 3/2015 | Wu |
| 2015/0063931 A1 | 3/2015 | Wu |
| 2015/0104266 A1 | 4/2015 | Guter |
| 2015/0174671 A1 | 6/2015 | Maurer |
| 2015/0266107 A1 | 9/2015 | Gonen |
| 2015/0273597 A1 | 10/2015 | Aliaga |
| 2015/0298220 A1 | 10/2015 | Ach |
| 2015/0321267 A1 | 11/2015 | Takai |
| 2015/0328696 A1 | 11/2015 | Wang |
| 2016/0001379 A1 | 1/2016 | Kauper |
| 2016/0001381 A1 | 1/2016 | Lach |
| 2016/0016236 A1 | 1/2016 | Evans |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl |
| 2016/0263664 A1 | 9/2016 | Son |
| 2016/0263666 A1 | 9/2016 | Myers |
| 2016/0311035 A1 | 10/2016 | Peng |

FOREIGN PATENT DOCUMENTS

| | | |
|---|---|---|
| CN | 1204976 A | 1/1999 |
| CN | 1258240 A | 6/2000 |
| CN | 1616170 A | 5/2005 |
| CN | 100455390 C | 1/2009 |
| CN | 101605622 A | 12/2009 |
| CN | 101610866 A | 12/2009 |
| CN | 102006958 A | 4/2011 |
| CN | 102310214 A | 1/2012 |
| CN | 106825693 A | 6/2017 |
| DE | 94340 | 9/1896 |
| DE | 94340 | 10/1897 |
| DE | 384720 C | 11/1923 |
| DE | 524677 | 5/1931 |
| DE | 118806 | 9/1984 |
| DE | 3733298 C2 | 4/1992 |
| DE | 19605157 | 9/1996 |
| DE | 19543233 | 5/1997 |
| DE | 29809638 U1 | 8/1998 |
| DE | 29809638 | 9/1998 |
| DE | 19945097 | 3/2001 |
| DE | 20204818 | 6/2002 |
| DE | 102004022747 A1 | 11/2005 |
| DE | 102007044095 A1 | 3/2009 |
| DE | 102012200690 | 7/2013 |
| DE | 102012200690 A1 | 7/2013 |
| DE | 102012212146 | 1/2014 |
| DE | 102013205889 | 5/2014 |
| DE | 102013209371 A1 | 11/2014 |
| DE | 102015106374 A1 | 10/2016 |
| EP | 118806 | 9/1984 |
| EP | 0599393 B1 | 2/1996 |
| EP | 1136161 | 9/2001 |
| EP | 813459 | 7/2003 |
| EP | 1476269 | 10/2009 |
| EP | 1996358 | 11/2011 |
| EP | 2524755 | 11/2012 |
| EP | 2551046 A1 | 1/2013 |
| FR | 907980 | 3/1946 |
| GB | 17961 | 12/1915 |
| GB | 1395855 | 5/1975 |
| JP | 5537209 | 3/1980 |
| JP | 11019812 A | 1/1999 |
| JP | 2002113606 A | 4/2002 |
| JP | 2004255533 A | 9/2004 |
| JP | 2005118940 | 5/2005 |
| JP | 2005169542 | 6/2005 |
| JP | 2006167871 A | 6/2006 |
| JP | 2008500195 A | 1/2008 |
| JP | 2011036977 A | 2/2011 |
| JP | 6211769 | 9/2017 |
| WO | 8403241 | 8/1984 |
| WO | WO1984003241 | 8/1984 |
| WO | WO9627469 | 9/1996 |
| WO | 9853943 | 12/1998 |
| WO | WO03031104 A1 | 4/2003 |
| WO | 2007107294 | 9/2007 |
| WO | WO2007107294 A1 | 9/2007 |
| WO | WO2008072840 A2 | 6/2008 |
| WO | WO2009128775 A1 | 10/2009 |
| WO | WO2010102793 A1 | 9/2010 |

OTHER PUBLICATIONS

Apr. 19, 2017 First office action.
May 25, 2017 Office action (3 months).
Jun. 27, 2017 Office action (3 months).
Sep. 6, 2017 Final Office Action.
Sep. 19, 2017 Final Office Action.
Dec. 1, 2017 Second Office Action.
Dec. 29, 2017 Office action (3 months) 1.
Dec. 18, 2017 Second Office Action.
Nov. 17, 2017 First Office Action.
Jan. 11, 2018 First Office Action.

* cited by examiner

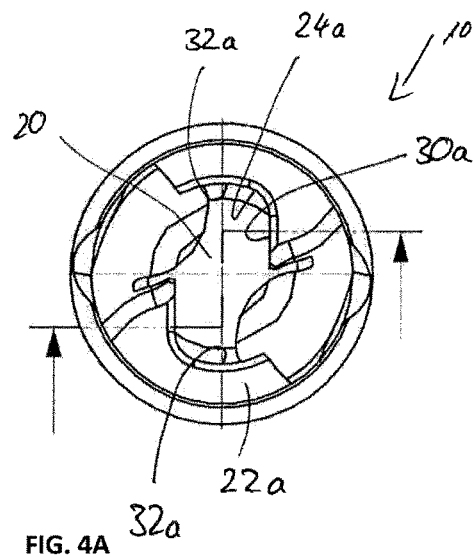
FIG. 4A
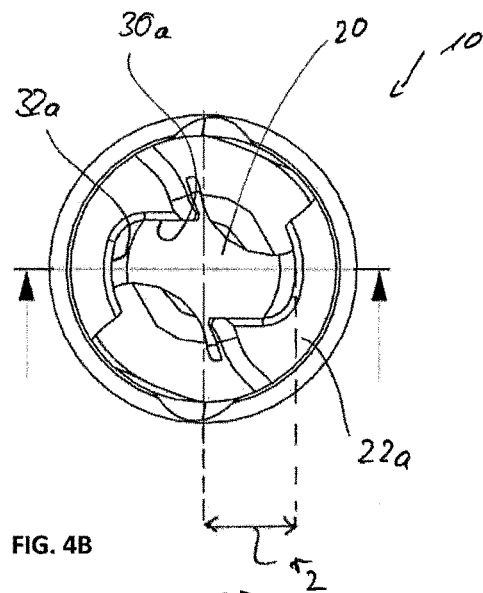
FIG. 4B
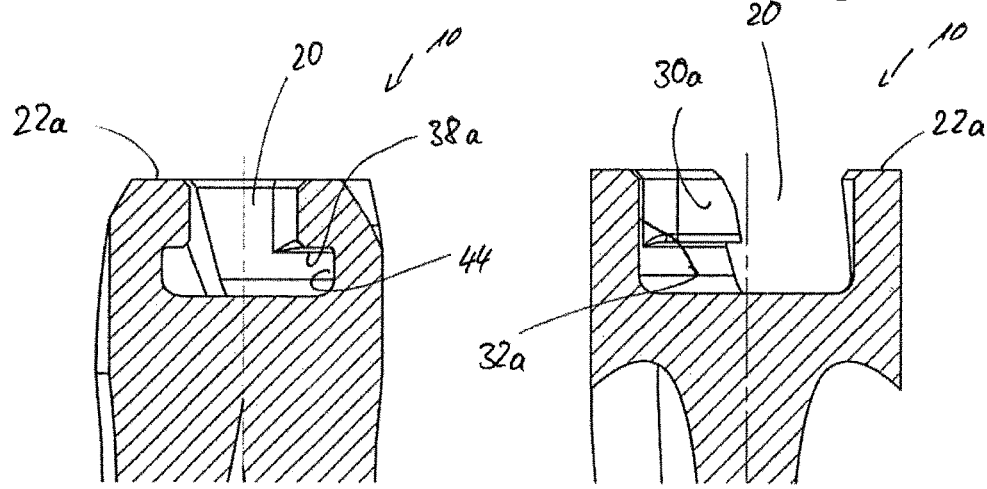
FIG. 4C
FIG. 4D

ROTARY TOOL, IN PARTICULAR A DRILL FOR SUCH A ROTARY TOOL

RELATED APPLICATION DATA

The present application claims priority pursuant to 35 U.S.C. § 119(a) to German Patent Application Number DE1020152117448 filed Jun. 24, 2015 which is incorporated herein by reference in its entirety.

FIELD

The invention relates to a rotary tool, in particular a drill, having the features of the preamble of claim 1. The invention further relates to a cutting head for such a rotary tool.

BACKGROUND

Such a rotary tool can be seen, for example, from DE 10 2014 206 796.0 which was unpublished at the time of application.

The rotary tool, in particular a drill, is what is known as a modular rotary tool, which extends axially along a rotational axis and has two coupling elements, namely a support and a cutting head, said cutting head being interchangeably mounted on the support. For this purpose, the support typically has on its end face two opposite fastening flanges preferably separated from each other by flutes that delimit a pin receptacle. A coupling pin of the cutting head is inserted into this pin receptacle. This is done by rotating the cutting head about the rotational axis relative to the support. This rotation forms a clamping connection between the cutting head and the support, so that the two coupling elements are held clamped against each other. In particular, no other fastening means, such as screws or the like, are used. In this case, the pin receptacle of the support has inner sheath surfaces and the coupling pin of the cutting head has outer sheath surfaces which mutually act together. For this purpose, mutually corresponding clamping sections are formed on the inner sheath surfaces and the outer support surfaces for transmitting a radial clamping force. These lie against each other in pairs in the mounted state. Preferably, a corresponding torque section is formed in addition on the inner sheath surfaces and the outer sheath surfaces for transmitting torque. The cutting head is completely enclosed by the coupling recess, that is, by the two opposite clamping or securing flanges, so that both the torque sections and the terminal sections are thus enclosed by the securing flanges.

In alternative embodiments, the torque sections are not enclosed by the clamping flanges, but rather extend in the radial direction to an outer peripheral line of the rotary tool, so that a peripheral side of the coupling pin in the area of the torque section is aligned with a peripheral side of the support. Such a coupling connection is disclosed, for example, in DE 10 2012 212 146 A1. In this embodiment variation, the mutually corresponding surfaces of the torque section are designed to be inclined as an axial slide safety assembly.

In a rotary tool known from DE 10 2012 200 690 A1, the torque sections and the clamping sections of the coupling connection are arranged one after the other in the circumferential direction on the coupling pin and on the support. In this case, the coupling pin has a roughly cuboid shape, wherein fluted areas are cut out from the rectangular shape via flutes. For axial tightening and to prevent axial pullout, either the mutually corresponding clamping sections and/or the mutually corresponding torque sections form a dovetail joint. The corresponding sections are thus inclined with respect to the rotational axis.

A modified embodiment of the coupling connection is known from DE 10 2013 205 889 B3, taken from DE 10 2012 200 690 A1. In this case, the torque sections and the clamping sections are disposed offset from one another in the axial direction so that either torque sections or clamp sections are formed on one axial level. Also in this embodiment, a dovetail joint is formed by obliquely inclined torque sections or clamping sections to produce axial tightening and to prevent axial slippage.

By means of such a dovetail joint known from the prior art, an effective positive-fit connection is formed in the axial direction. Due to the special mounting method, this is made possible by screwing the coupling pin of the cutting head into the pin receptacle of the support.

In addition to these dovetail connections, stepped undercuts are also known for preventing axial pullout.

Thus, from U.S. Pat. No. 6,582,164, for example, radially outwardly projecting flanges are formed on the outer circumferential surfaces of the coupling pin which are screwed in the manner of a thread into a corresponding recess on the pin receptacle. For easy insertion, in this case, the lateral surfaces of these thread ridges are inclined obliquely relative to the axis of rotation.

A coupling connection can also be learned from U.S. Pat. No. 7,070,367 B2, wherein flanges are formed on the outside of the coupling pins which extend helically and form a screw thread. In this way the cutting head is axially tightened when screwed in. The helically extending flange in this case has a roof surfaces inclined to the rotational axis.

DE 10 2014 206 796.0, which was unpublished at the time of application, describes a further embodiment of the embodiment taken from DE 10 2012 200 690 A1. For an axial pullout safety device—except for any recesses present due to grooves—the essentially cuboid coupling pin has, instead of the dovetail joint, a circumferential flange on the end of the coupling pin which merges to form a step for clamping and torque surfaces. A horizontal stop surface is formed by the step which acts as an axial pullout safety device. The clamping surfaces are thereby formed by a radial groove.

A coupling connection is known from KR 10 2008 0000544 A in which only clamping surfaces are formed on the coupling pin and the torque surfaces are formed outside the coupling recess. For an axial pullout safety device, a circumferential groove is placed approximately centrally in the cylindrical-sheath-shaped coupling pin, and a corresponding flange on the support engages in it.

Overall, the known coupling connections are characterized by a complex geometry, which is often very expensive to produce.

SUMMARY

Based on this, the object of the present invention is to provide a coupling connection that is simple to manufacture.

The object is achieved according to the invention by a rotary tool, in particular a drill, having the features of claim 1. The rotary tool in this case extends axially along an axis of rotation and comprises two coupling elements, namely a support and a cutting head. The cutting head is interchangeably mounted on the support by twisting. For this purpose, the support typically has on its end face, in particular, two diagonally opposite fastening flanges, preferably separated from each other by flutes having inner sheath surfaces that delimit a pin receptacle. A coupling pin of the cutting head is inserted to clamp in the pin receptacle. The coupling pin has outer sheath surfaces. By turning the coupling pin relative to the pin receptacle, the external sheath surfaces come into contact with the inner sheath surfaces on which mutually corresponding sheath sections are formed. These sheath sections come to lie in pairs against each other when the cutting head is attached to the support. The sheath sections are used for centering the two coupling parts to one another and, preferably, also for transmitting a radial clamping force as well. Therefore, the sheath sections are hereinafter referred to, without loss of generality, as clamping sections. Preferably, the two coupling parts are held to one another exclusively by clamping. Alternatively or in addition to clamping, screws can be provided to attach the two coupling parts together.

In addition, besides the clamping sections, mutually corresponding torque sections are formed for transmitting torque to the cutting head on the one hand and to the support on the other hand. In this case, the torque sections in general have a radial directional component for torque transmission.

To enable simple manufacture of the coupling parts for this coupling connection, the clamping sections and, in particular, the torque sections preferably extend parallel to the rotation axis, and are thus preferably not designed to be obliquely inclined. For an axial pullout safety device, mutually corresponding stop surfaces are effectively formed, rather, in the axial direction on the pin receptacle and on the coupling pin. The corresponding stop surfaces form an effective axial positive fit. For this purpose, a stop element is designed on the coupling pin.

This stop element is now formed in such a manner that its extension in the radial direction is less than or equal to a maximum radial extension of the clamping sections. Radial extension in this connection means, in general, the radial distance to the axis of rotation. In addition, the stop surfaces and the clamping surfaces are further arranged offset from one another in the rotational or circumferential direction.

This embodiment is based first on the consideration that it is expensive to manufacture oblique surfaces having the required level of precision for the clamping sections and for the torque sections. Therefore, it is provided in particular that these sections extend only parallel to the axis of rotation. The function of the axial pullout safety device is exerted via the separate, that is, additional stop surfaces regardless of the surfaces for clamping on the clamping section and for torque transmission on the torque section. The coupling pin and the pin receptacle preferably each have a pair of clamping sections which are each arranged diagonally opposite with respect to the axis of rotation.

The coupling pin is preferably interrupted overall by groove sections of flutes, just like the securing flanges are separated from each other by groove sections of flutes. Furthermore, the cutting head is secured purely by clamping without additional fasteners such as screws, and solely by the rotation of the cutting head relative to the support about the rotational axis.

The torque sections are generally oriented in such a way that they transmit an applied torque from the support onto the cutting head during the machining process, i.e., during the drilling process. For this purpose, the torque sections generally have a surface portion which is oriented at an angle to a circumferential direction. The clamping sections, in contrast, are preferably not designed for transmitting a torque. They extend in the circumferential direction preferably along cylindrical outer surfaces. Varying from a pure cylinder shape, this can optionally also—viewed in cross section—extend along an elliptical path to efficiently brace against the clamping force when the coupling pin is inserted.

This configuration is based on the embodiment described in the subsequently published DE 10 2014 206 796.0, in which a radially outwardly projecting flange is formed at the end of the coupling pin for the axial pullout safety device. The variant described here having the stop element which has the maximum extension of the clamping surfaces in the radial direction and is preferably set back in the radial direction has, on the one hand, the advantage of creating no protruding nose and, on the other hand, that inserting the coupling pin into the coupling receptacle is in this way simplified. In addition, there is no weakening of the support in the area of the clamping surfaces as a result of a groove into which the flange projects in the radial direction.

Furthermore, it is particularly important that the stop surfaces and the clamping sections are offset from one another in the rotational or circumferential direction. This thus makes decoupling possible—viewed in the rotational or circumferential direction—between the stop surfaces and the clamping surfaces. This allows, for example, the preferred embodiment in which the stop element is formed at the end of the coupling pin. Also, this embodiment is particularly suitable for such variants of the embodiment in which the torque sections for transmitting a torque are formed on the coupling pin as well. Basically, however, the embodiment with the special stop element is also applicable to those embodiments in which the torque sections are not formed on the coupling pin, but rather extend in the radial direction up to an outer circumferential line of the support.

In a preferred development, it is provided that an interference fit is formed between the corresponding abutment surfaces of the two coupling parts, the stop surfaces thus being pressed against each other in the assembled state. To make this possible, an insertion bevel is appropriately formed in each case so that when the coupling pin is screwed into the pin receptacle, the coupling pin is drawn into the pin receptacle in the axial direction before the interference fit is then formed between the horizontally extending abutment surfaces. The insertion bevel extends circumferentially only over a small angular range, for example less than 5°.

With a view to manufacturing the stop element as simply as possible, the latter has a circular cross-sectional contour—apart from any recesses present due to grooves. The stop element is therefore designed overall as a circular member having a circumferential cylindrical sheath surface, possibly interrupted by the grooves. Therefore, in this respect, the stop member itself defines a guide pin. As a whole, it can be regarded as a kind of plate which is formed on the end of the coupling pin. In the area of the clamping sections, the lateral surface of the stop member can be aligned in this way with the clamping sections, thus having the same radial dimension in the region of the clamping sections. In a preferred alternative, the lateral surface of the stop element, however, is formed in the region of the clamping sections set back in the radial direction.

Furthermore, the stop surfaces preferably extend horizontally, that is, perpendicular to the direction of rotation. This ensures an efficient axial pullout safety device.

It is further appropriately provided that the stop surfaces are arranged following to the torque sections in the axial direction. This means that the torque sections and the stop surfaces, at least in certain areas, sweep the same rotation angle, so that—viewed in the axial direction—the stop surfaces are arranged following the torque surfaces without rotational angular displacement.

In particular, in the embodiment with the torque sections directly on the coupling pin, the torque sections have a radial component and thus usually do not lie on a circular circumferential line. Due to the preferred configuration of the stop element, which is approximately circular when viewed in cross section, the latter therefore projects into the area of the torque sections in the radial direction. This is expediently done in such a way that approximately triangular stop surfaces are formed. The stop surface is delimited on one side of the triangle in particular by the torque portion, on a second side of the triangle at one edge by the flute and at the base of the triangular configuration is a curved side due to the approximately circular configuration of the stop member.

Preferably, in this case each stop surface is formed in the axial direction directly following the torque section. The torque section therefore preferably extends over the horizontal stop surface to form a rounded edge.

Expediently, the stop element is further formed on the end of the coupling pin. Following the stop element, therefore, there are no longer any clamping surfaces or torque surfaces arranged in the axial direction. At most, bevels are still formed on the stop element. What is known as an insertion pin can also be arranged, which serves to roughly center the cutting head during insertion. This is usually designed as a cylinder pin concentric to the axis of rotation.

In a suitable embodiment, the mutually corresponding torque sections are formed on the inner sheath surfaces and on the outer sheath surfaces, that is, directly on the pin on the one hand and, on the other hand, on the inner sheath surfaces of the support.

In this version of the embodiment, the coupling pin—in the region of torque sections—is further essentially approximately cuboid, that is, it has a roughly elongated cross-section. For this purpose, the long sides are formed by the torque sections and the short end sides are formed by the clamping sections. Therefore, the torque sections and the clamping sections are preferably at the same axial height. The clamping sections are formed by rounded, arc-shaped areas. The end faces of the cuboid configuration are thus formed by curved lateral surfaces that form the clamping sections. This approximately cubical pin area, in turn, is interrupted by grooves cut in the longitudinal cuboid sides.

The object is further achieved by a cutting head for such a rotary tool having certain features described in additional detail herein below. The advantages with respect to the rotary tool and preferred embodiments are appropriately transferred to the cutting head as well. This therefore has a stop element on the coupling pins, the radial extension of which is less than or equal to a maximum radial extension of the clamping sections of the coupling pin. Furthermore, the stop surfaces are arranged offset relative to the clamping surfaces in the circumferential direction.

BRIEF DESCRIPTION OF THE DRAWINGS

An exemplary embodiment of the invention will be explained in more detail with reference to the figures. These show:

FIG. 4C is a sectional view through the support along section line C-C of FIG. 4A, and FIG. 4D is a sectional view of the support along section line D-D of FIG. 4B.

In the figures, parts that operate identically are represented by the same reference numerals.

DETAILED DESCRIPTION

Figure 1:
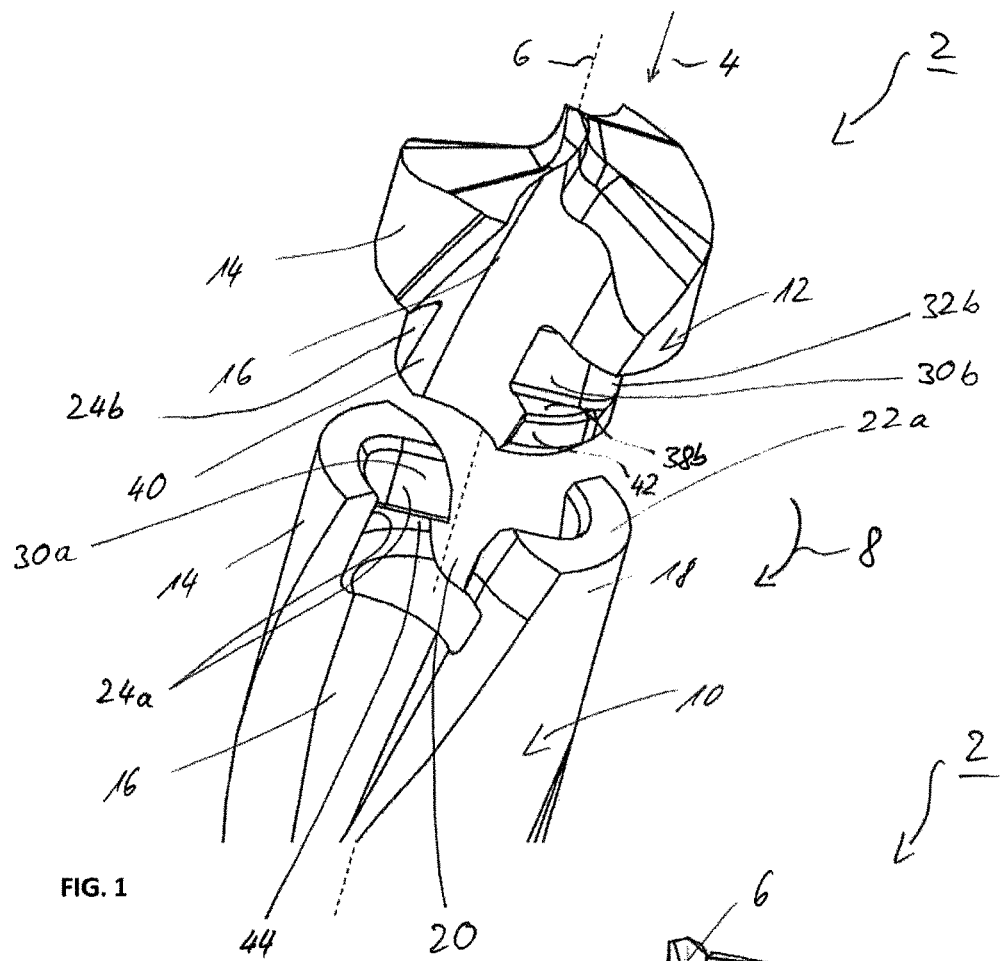
FIG. 1 is a partial perspective view of a modular drill tool with cutting head and support shown in an exploded view.
Figure 2:
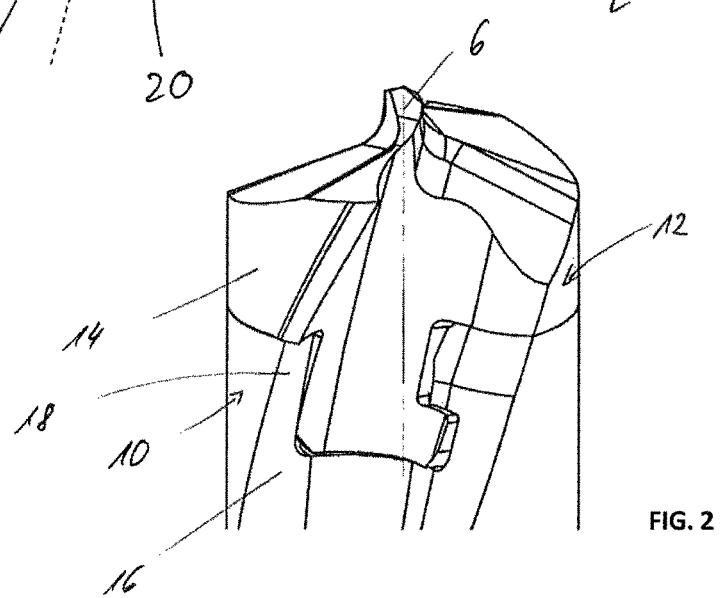
FIG. 2 shows a partial side view of the drilling tool in the area of the cutting head with cutting head inserted.

The rotary tool 2 shown in the figures is designed as a modular drilling tool. It extends in an axial direction 4 along a rotational axis 6. During normal operation, the rotary tool 2 rotates in the direction of rotation around the axis of rotation 6, which also defines a circumferential direction 8.

The rotary tool 2 is composed of a support 10 and a cutting head 12 interchangeably mounted thereon. The cutting head 12 has cutting edges not illustrated here in detail which are usually connected to each other in the center on a drill end by means of a cross cutting edge and which extend radially outwardly. The main cutting edges join the face of the main flanks counter to the direction of rotation. On its circumferential side, the cutting head 12 has a back 14 which is interrupted by flutes 16 positioned opposite each other. These thus begin in the cutting head 12 and transition into the support 10. In the exemplary embodiment, the flutes 16 extend approximately helically. The support 10 has a grooved shaft section to which, for example, secondary cutting edges continue which begin at the cutting head 12 and extend along the flutes 16. An ungrooved clamping portion is typically joined onto the grooved shaft region of the support 10 with which the rotary tool 2 is clamped into a machining tool.

Below, mutually corresponding elements on the support 10 are designated by the letter a and on the cutting head 12 are designated by the letter b.

On its face, the support 10 has two approximately diagonally opposite securing flanges 18 which are interrupted by the flutes 16. The end faces of the securing flanges 18 are each bounded by planar end contact surfaces 22a, which are disposed within a common horizontal plane to which the rotational axis 6 is thus perpendicularly oriented.

The pin receptacle 20 is circumferentially limited by inner circumferential surfaces 24a of the securing flanges 18. Furthermore, it is delimited on the bottom side by a bottom surface which runs horizontally, that is, perpendicular to the rotational axis 6. In addition, in a manner not shown here, coolant channels may run in the support 10 which exit in the bottom surface, for example, and are there aligned with corresponding coolant channels of the cutting head 12.

On the inner sheath surfaces 24a, in each case the support 10 has torque sections 30a, clamping sections 32a and intermediate transition sections that join directly to one another in the circumferential direction 8.

The cutting head 12 has a coupling pin 40 extending in the axial direction 4 corresponding to the pin receptacle 20. The coupling pin 40 is radially offset from the peripheral surfaces of the back 14. Corresponding to the pin receptacle 20, the coupling pin 40 has outer sheath sections 24b on which likewise are formed torque sections 30b, clamping sections 32b and intermediate transition sections. These join each other in each case in the circumferential direction 8, are preferably not staggered in the axial direction 4, and each is thus at the same axial height.

A radial projection to the back 14 is formed by the radially set-back coupling pin 40 whereby two preferably horizontally extending head plate surfaces 22b are formed, which, in turn, are arranged in a common horizontal plane and are separated from each other by flutes 16. When mounted, the cutting head 12 lies thereon.

In addition, an insertion pin may be formed on the coupling pin 40 concentric to the axis of rotation 6, this being designed only for initial centering of the cutting head 12 during insertion into the support 10. The actual centering of the cutting head 12 is accomplished by the clamping sections 32a, b.

Figure 3A:
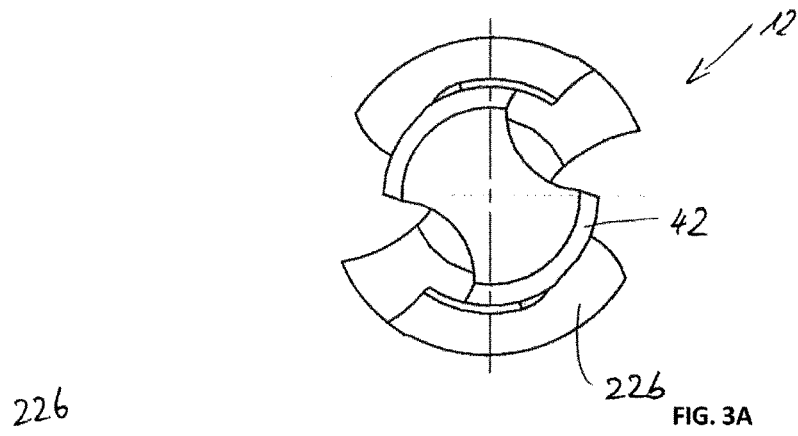
FIG. 3A is a view of the back side of the cutting head.

Of particular importance with respect to an axial pullout safety device is the fact that, in particular, a stop element 42 is arranged on the end of the coupling pin 40 that preferably defines somewhat triangular-shaped stop surfaces 38b on coupling pin 40. These extend in the horizontal direction, that is, perpendicular to the axis of rotation 6. They are located, in particular, immediately following the torque sections 30b in the axial direction 4. The torque sections 30b extend beyond a rounded edge into the abutment surfaces 38b. The stop element 42—as is particularly clear in FIGS. 3A and 3C—is designed as a whole as a circular disk which is interrupted only in the area of the flutes 16. The stop element 42 in this case has a circular peripheral contour that is interrupted only by the flutes 16. In the axial direction, the stop element has a significantly more limited extension than the torque section 30b and the clamping section 32b.

In this connection, the stop surfaces 38b preferably extend over an angular range which is at least approximately equal to the angular range over which the torque sections 30 extend.

In the exemplary embodiment, the disc-shaped stop element 42, viewed in the circumferential direction 8, virtually extends into the clamping section 32b, thus aligning the outer surface of the stop element 42 with the outer surfaces of the clamping section 32b.

Figure 3B:
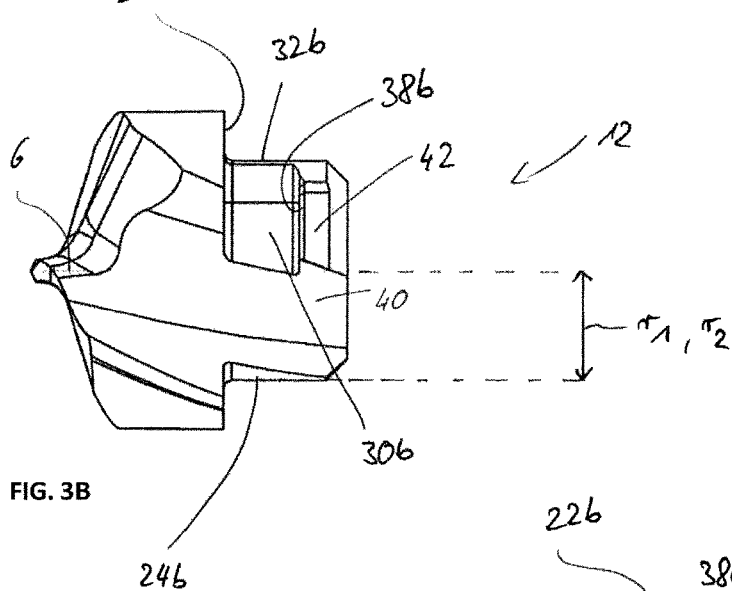
FIG. 3B is a side view of the cutting head of FIG. 3A after a rotation of 90° to the right of the view of FIG. 3A
Figure 3C:
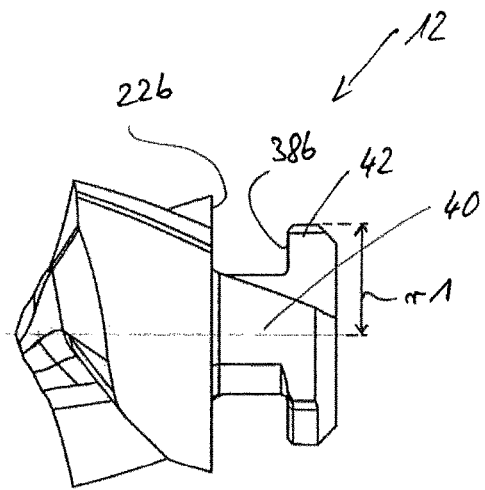
FIG. 3C is another side view of the cutting head according to FIG. 3B after a 90° rotation about the rotational axis of the view of FIG. 3B, FIG. 4A, 4B show views of the support of the drilling tool, each rotated at 90° to each other around the axis of rotation

As can be seen in particular from the side views of FIGS. 3B, 3C, the clamping section 32b and the torque sections 30b are arranged directly between the head surfaces 22b and the stop element 42, and extend to these via rounded edges. In the axial section area in which the torque sections 30b and the terminal sections 30a are formed, the coupling pin 40 has an overall cuboidal configuration, that is, an elongated cross-sectional contour. In this way, the longitudinal sides are rounded by the clamping sections 30b and front sides, having, for example, a cylindrically or even elliptically rounded shape, and define the clamping sections 32B.

The pin receptacle 20 in the support 10, as is apparent from FIGS. 4A, 4B, 4C, 4D, is complementary on the whole to the coupling pin 40 of the cutting head 12. In the assembled state, the mutually corresponding clamping sections 32a, 32b and torque sections 30a, 30b in each case lie directly flat against one another. The flutes 16 continue into the cutting head 12 aligned by the support 10.

As can be seen in particular from the top views shown in FIGS. 4A and 4B, in cross-section, the pin receptacle 20 has an approximately rectangular contour in the region of the clamping sections 32a and the torque sections 30a. From the top views of FIGS. 4A and 4B, the transition sections are also very clearly visible in the corner of the cuboid base geometry.

A groove 44 corresponding to the stop element 42 is preferably formed in the support 10 immediately adjacent to the bottom surface. The groove 44 is designed in particular as a circular section groove. This means that the groove 44 corresponding to the stop element 42 forms lateral surfaces which extend along a circular arc, thus forming sections of a cylindrical sheath surface. The sheath surface of the cylinder, in turn, is preferably interrupted only by the flutes 16. In the exemplary embodiment, the cylindrical surface of the groove 44 is aligned with this in the clamping sections 32a (as viewed in the axial direction).

Suitable triangular stop surfaces 38a are formed on the support 10 corresponding to the roughly triangular configuration of the stop surfaces 38b on the coupling pin 40. The torque sections 30a are formed in this peripheral region of the stop surfaces 38a. For this purpose, a portion of the support 10 which forms the torque sections 30a extends virtually radially inward beyond the groove 44 in the manner of an overhang (see FIG. 1, in particular).

In the region of the torque sections 30a, b, therefore, a projection above the groove 44 is virtually formed, as can be seen particularly in FIG. 4C.

At the same time, however, no overhang is formed in the clamping sections 32a. Rather, in the exemplary embodiment, the lateral surface of the groove 44 is aligned with the clamping section 32A. In this area, the support 10 thus has a continuous axially extending wall area. This means that in the exemplary embodiment a radial extension $r_1$ of the stop element 42 and the groove 44 (see FIG. 3A in this connection and FIG. 4C) is identical to the radial extension $r_2$ of the clamping sections 32a, 32b (for this, see FIG. 3B and FIG. 4B). Alternatively, the radial extension $r_1$ of the stop element 42 is less than that of the clamping sections 32a, 32b.

As is apparent in particular from the top view of the support according to FIG. 4A, the pin receptacle 20 and the corresponding coupling pin 40 in the region between the stop element 42 and head contact surface 22b have an essentially rectangular shape and thus an approximately block shape. Here, opposite corner regions of approximately rectangular cross-section are excluded by the flutes 16. The clamping sections 32a, b are formed on the narrow sides of this approximately rectangular cross-section, and the torque sections 30a, b are formed on the longitudinal sides.

The torque sections 30a, b thus extend in a straight line, viewed in cross section, whereas the clamping sections 32a, b extend along an arc line, in particular a circular arc line. The corner areas of the approximately rectangular cross-section are rounded so that the rectilinear torque sections 30a merge into the rounded clamping sections 32a, b. In this way, the rounded corner areas are formed by the transitional sections.

The section surfaces of the coupling pin 40 and the pin receptacle 20, that is, the torque sections 30a, b, the clamping sections 32a, b and the transitional sections, preferably run parallel to the rotational axis 6 and thus to the axial direction 4. They therefore have no angle of inclination, and do not form conical surfaces.

To mount the cutting head 12, it is first plugged with its coupling pin 40 beforehand into the pin receptacle 20 in the axial direction 4. The entire cutting head 12 is then rotated within the pin receptacle 20 about the rotational axis 6 counter to the rotational direction. In this way, stop surfaces 38a, b engage behind. In addition, the clamping sections 32a, b form an interference fit and thus are clamped. In this way, a radial clamping force is applied by the securing flanges 18 onto the coupling pin 40 at the clamping sections 32a, b. In addition, the mutually corresponding torque sections 30a, b become attached to each other in the end position. In operation, the torque exerted in the torque and circumferential rotational direction 8 by the support 10 via the torque sections 30*a, b* is transmitted to the cutting head 12. In the mounted end position, the head bearing surfaces 22*b* lie flat on the end bearing surfaces 22*a*.

A reliable axial pullout safety device is formed by the mutually corresponding, horizontally extending stop surfaces 38*a, b*. Expediently, in the process, a press fit is also formed when the coupling pin 40 is screwed into the pin receptacle 20, so that, at the same time, the coupling pin 40 is placed into the pin receptacle 20 in the axial direction 4 at a defined axial position. As an alternative to forming the interference fit in the area of the stop surfaces 38*a, b*, these may optionally lie against each other with slight play.

The invention claimed is:

1. A rotary tool which extends along a rotational axis in the axial direction and has two coupling parts, comprising:
    a support the support having securing flanges at an end of the support and inner sheath surfaces that delimit a pin receptacle; and
    a cutting head interchangeably mounted on the support, the cutting head having a coupling pin inserted into the pin receptacle of the support so as to be clamped by rotating the cutting head relative to the support,
    wherein the coupling pin has outer sheath surfaces;
    wherein sheath sections corresponding to each other are formed on the inner sheath surfaces of the support and the outer sheath surfaces of the coupling pin for radial centering and for transmitting a radial clamping force;
    wherein mutually corresponding torque sections are formed on the cutting head and on the support for transmitting a torque;
    wherein stop surfaces are formed on the pin receptacle and on the coupling pin in the axial direction, the stop surfaces being formed by a stop element on the coupling pin;
    wherein the stop the stop element on the coupling pin has a first radial extension (r1) and the sheath sections of the coupling pin have a second radial extension (r2), the first radial extension being less than or equal to the second radial extension; and
    wherein the surface sections are offset relative to one another in the circumferential direction.

2. The rotary tool according to claim 1, wherein the stop element has a circular cross-sectional contour, excluding any recesses present due to the flutes.

3. The rotary tool according to claim 1, wherein the stop surfaces extend horizontally.

4. The rotary tool according to claim 1, wherein the stop surfaces are formed following the torque sections in the axial direction.

5. The rotary tool according to claim 1, wherein the stop surfaces are formed in an approximately triangular shape.

6. The rotary tool according to claim 1, wherein the stop element is formed at the end of the coupling pin.

7. The rotary tool according to claim 1, wherein additional torque sections corresponding to one another are designed on the inner sheath surfaces and on the outer sheath surfaces to transmit a torque.

8. The rotary tool according to claim 1, wherein the coupling pin has a substantially cuboid-shaped configuration in the region of the torque sections defining an elongated cross-sectional contour in the region of the torque sections.

9. The rotary tool according to claim 8, wherein the torque sections are formed by a longitudinal side of the cuboid-shaped configuration.

* * * * *